US 6,717,427 B2

(12) United States Patent
Thiel et al.

(10) Patent No.: US 6,717,427 B2
(45) Date of Patent: Apr. 6, 2004

(54) CIRCUIT ARRANGEMENT

(75) Inventors: Holger Thiel, Hamburg (DE); Michael Liebig, Mildstedt (DE); Wolfgang Tobergte, Halstenbek (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 144 days.

(21) Appl. No.: 10/055,383

(22) Filed: Jan. 22, 2002

(65) Prior Publication Data

US 2002/0153902 A1 Oct. 24, 2002

(30) Foreign Application Priority Data

Jan. 23, 2001 (DE) .......................................... 101 02 863

(51) Int. Cl.[7] .......................... G01R 31/02; G01R 31/28
(52) U.S. Cl. ...................... 324/763; 324/755; 324/73.1; 324/76.52
(58) Field of Search ................................ 324/763, 755, 324/73.1, 76.52, 158.1; 714/738, 739

(56) References Cited

U.S. PATENT DOCUMENTS 5,235,273 A * 8/1993 Akar et al. ................. 714/724
6,282,682 B1 * 8/2001 Walker et al. ............... 714/738
6,469,514 B2 * 10/2002 Okayasu ..................... 324/532
2003/0001557 A1 * 1/2003 Pisipaty ..................... 324/76.53
2003/0016041 A1 * 1/2003 Ueda et al. .................. 324/763

FOREIGN PATENT DOCUMENTS

EP          0949786 A1    11/1998    .......... H04L/27/06

OTHER PUBLICATIONS

Jp11355367; A (Sony Corp), Dec. 24, 1999.

* cited by examiner

Primary Examiner—Kammie Cuneo
Assistant Examiner—Paresh Patel
(74) Attorney, Agent, or Firm—Kevin Simons

(57) ABSTRACT

A circuit arrangement (100) for controlling a first terminal and a second terminal of a preferably contactless integrated circuit, particularly for testing a CMOS circuit, tests a multitude of intergrated circuits simultaneously while using a low-cost structure. The circuit arrangement permits a simple write/read unit assigned to the integrated circuit, and enables the simultaneous testing of a multitude of integrated circuits using a low-cost structure.

13 Claims, 2 Drawing Sheets

CIRCUIT ARRANGEMENT

FIELD OF THE INVENTION

The invention relates to a circuit arrangement for controlling a first terminal and a second terminal of a preferably contactless integrated circuit, particularly for testing a CMOS circuit.

BACKGROUND OF THE INVENTION

In a multitude of integrated circuits that are used nowadays, the transmission of data from and to the integrated circuit as well as the transfer of energy to the integrated circuit is effected in a contactless way, for example, by means of microwaves, lightwaves, capacitive coupling or inductive coupling. In the latter case, the integrated circuit can be controlled via at least a coil which is connected to the integrated circuit via a first terminal and a second terminal.

In this context, particularly after manufacturing the integrated circuit which may be arranged on the wafer of the carrier substrate of semiconducting or insulating material, it is necessary to control this integrated circuit by way of contacts via the first and second terminal, i.e. to control them separately via the coil interfaces, for example, for the purpose of subjecting the integrated circuit to a trial and test operation. To this end, the integrated circuit is powered with an AC voltage via the coil interfaces and a bidirectional exchange of data takes place simultaneously.

When an integrated circuit is to be tested in the conventional way, a test arrangement with two tester outputs and one modulation output is customarily provided. The two tester outputs generate carrier clocks of opposite phase which are connected to the first and second terminal of the integrated circuit via resistors internally preceding the relevant tester outputs. If the voltage at the modulation output is higher than the voltage at the tester outputs, diodes arranged between the tester outputs and the modulation output are blocked and the carrier amplitude is equal to the voltage at the two tester outputs. By decreasing the voltage at the modulation output, the two tester outputs are loaded and the carrier amplitude is decreased. The modulation index can be adjusted via the voltage at the modulation output.

For a simultaneous multi-test, the modulation in this conventional test arrangement is to be separately built up for every individual integrated circuit. In other words, this means that three channels—corresponding to the two tester outputs and the modulation output—of the conventional test arrangement are required for modulating the integrated circuit. Since a further test-pin channel is additionally required for each integrated circuit, a test arrangement with, for example, 64 channels can subject a maximum number of sixteen integrated circuits to a parallel test.

A circuit arrangement for ASK demodulation (ASK= amplitude shift keying) is known from EP 0 949 786 A1. This document describes a circuit arrangement for demodulating a voltage which is (ASK)-modulated by changing the amplitudes between the low and the high level, particularly for a chip card which comprises a bandpass filter for suppressing interference having a low frequency with respect to the modulation frequency, for suppressing the carrier frequency and for generating a pulse upon a change of the amplitudes between the low level and the high level, as well as a threshold value switch with which the demodulated voltage is generated by impressing it with the pulses and by switching it between two states.

The conventional circuit arrangements described above have in common that compensating currents occur at the tester outputs so that the circuit arrangements become elaborate and complicated. Moreover, the conventional circuit arrangements described above are suitable for a simultaneous multi-test to a limited extent only because a relatively high number of channels of the circuit arrangement is required for each integrated circuit.

SUMMARY OF THE INVENTION

It is an object of the invention to provide a circuit arrangement of the type described in the opening paragraph in which a multitude of integrated circuits can be tested simultaneously while using a low-cost structure. Moreover, the present invention is to provide a circuit arrangement for a simple write/read unit assigned to the integrated circuit.

This object is achieved by the characteristic features defined in claim 1. Advantageous embodiments and further improvements of the present invention are defined in the dependent claims.

In accordance with the teaching of the present invention, the circuit arrangement comprises at least a control stage, at least a first driver stage and at least a second driver stage which is complementary to the first driver stage. The first driver stage and the second driver stage operate to a certain extent as a bridge stage which provides a symmetrical supply via the first terminal and the second terminal of the integrated circuit, in which the first driver stage is connected to the first terminal of the integrated circuit and the second driver stage is connected to the second terminal of the integrated circuit—or conversely.

The amplitude modulation is effected via the switching of the respective power supply voltage between the two driver stages, in which the power supply voltages of the two driver stages are switched at different instants in accordance with the teaching of the present invention. To this end, the two driver stages are impressed with symmetrical clock signals which are inverted with respect to each other so that two equally long clock phases [a] and [b] are produced at the output of the driver stages. In clock phase [a] the power supply voltage is connected to the output of the relevant driver stage and in clock phase [b] the reference potential is connected to the output of the relevant driver stage.

The switching of the power supply voltage between the two driver stages mentioned above is effected in accordance with the teaching of the present invention in clock phase [b] in which the power supply voltage is not connected to the output of the relevant driver stage. Since the two driver stages operate with a mutually inverted clock, the relevant instant of switching is different for the two driver stages.

In connection with the present invention, those skilled in the art will appreciate that the circuit arrangement, although having a relatively simple structure, is implemented for data transmission by means of ASK modulation (ASK= amplitude shift keying), for example, for testing an integrated circuit or for a write/read unit assigned to an integrated circuit.

In contrast to the prior-art circuit arrangement disclosed in EP 0 949 786 A1, a variable degree of modulation with adjustable pulse rates and with adjustable pulse widths provides the possibility of response of all reception/ transmission parameters of the integrated circuit, also by means of a standard test arrangement. Particularly when using such a standard test arrangement, a reduction of the test period by about 50% as compared with conventional circuit arrangements is possible with the circuit arrangement according to the invention, which circuit arrangement functions in this case as a bridge circuit or a bridge stage.

The invention also relates to a preferably contactless integrated circuit, particularly a CMOS circuit controlled and particularly tested by at least a circuit arrangement of the type described hereinbefore.

These and other aspects of the invention are apparent from and will be elucidated with reference to the embodiments described hereinafter.

DETAILED DESCRIPTION OF THE INVENTION

Figure 1:
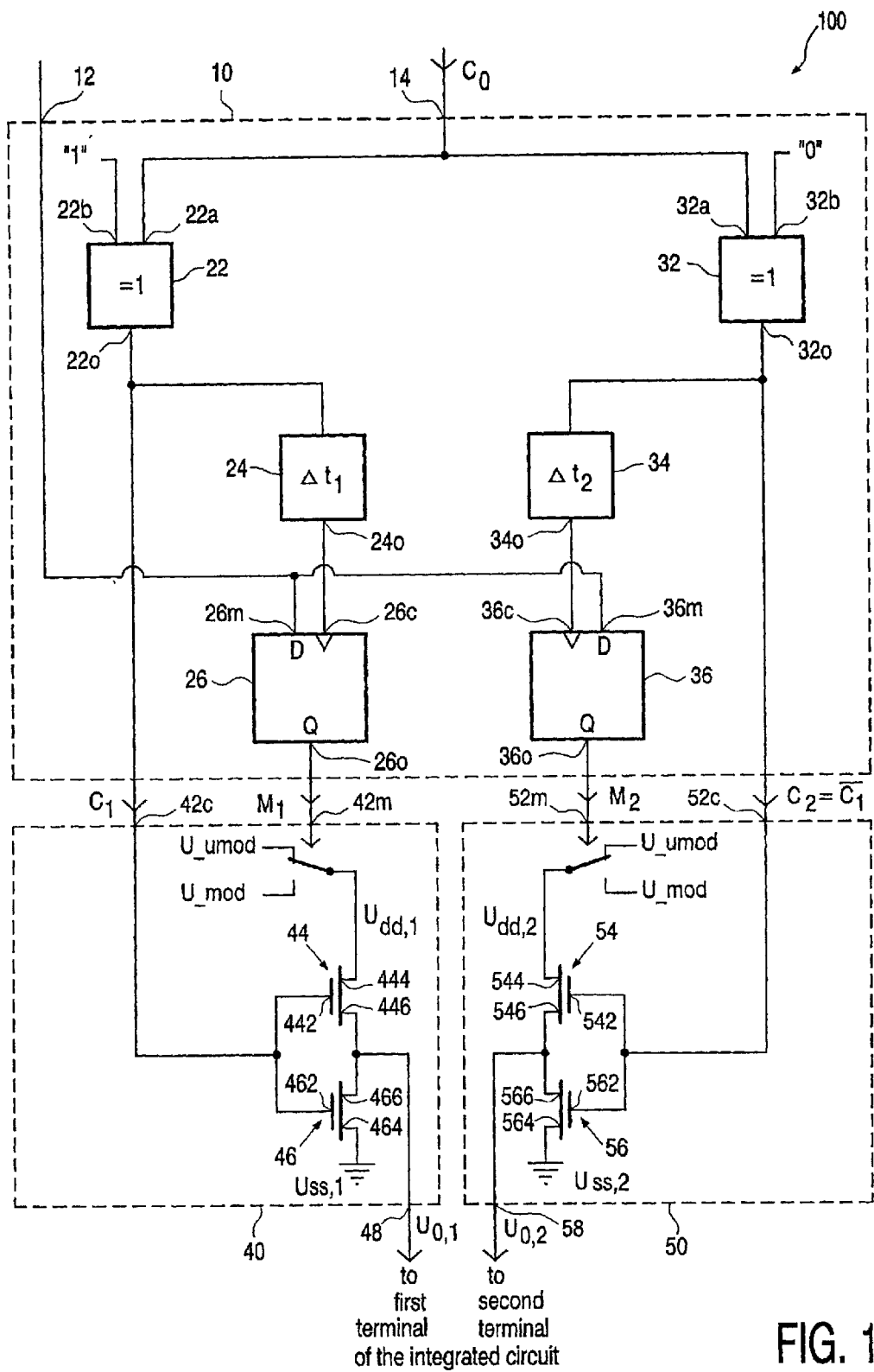
FIG. 1 shows diagrammatically an embodiment of a circuit arrangement according to the present invention.

The circuit arrangement 100 is provided for controlling a first terminal and a second terminal (for the sake of clarity not shown in FIGS. 1 and 2) of a contactless integrated circuit, namely a CMOS circuit (CMOS=complementary metal oxide semiconductor).

To this end, the circuit arrangement 100 comprises a control stage 10 which has for its function to convert an external modulation signal $M_0$ originating, for example, from a known test arrangement and an external clock signal $C_0$ also originating from the test arrangement into a first modulation signal $M_1$, into a second modulation signal $M_2$ which is temporally shifted with respect to the first modulation signal $M_1$ by approximately half a clock period of the external clock signal $C_0$, into a first clock signal $C_1$ and into a second clock signal $C_2$ which is inverted with respect to the first clock signal $C_1$.

To this end, the control stage 10 has a modulation signal input 12 provided for the external modulation signal $M_0$, as well as a clock signal input 14 provided for the external clock signal $C_0$. An input 22a of a first logic gate circuit 22, namely an exclusive-OR circuit is connected to this clock signal input 14 and the other input 22b is impressed with a first one-bit signal (state "1") so that the output 22o of the first logic gate circuit 22 supplies the first clock signal $C_1$.

Parallel to the first logic-gate circuit 22, the input 32a of a second logic gate circuit 32, namely also an exclusive-OR circuit is connected to the clock signal input 14, while the other input 32b is impressed with a second one-bit signal (state "0") which is inverted with respect to the first one-bit signal, so that the output 32o of the second logic gate circuit 32 supplies the second clock signal $C_2$ which is inverted with respect to the first clock signal $C_1$.

Furthermore, the control stage 10 comprises a first delay unit 24 which is connected to the output 22o of the first logic gate circuit 22 and delays the first clock signal $C_1$ by a first time interval $\Delta t_1$ (FIG. 1). A first D(elay)-flipflop unit 26 is connected to this first delay unit 24 and its clock input 26c is connected to the output 24o of the first delay unit 24 and the D input 26m is connected to the modulation signal input 12. In this way, the Q output 26o of the first D(elay)-flipflop unit 26 supplies the first modulation signal $M_1$, while the Q output 26o follows the signal of the D input 26m.

Parallel thereto, the control stage 10 comprises a second delay unit 34 which is connected to the output 32o of the second logic gate circuit 32 and delays the second clock signal $C_2$ by a second time interval $\Delta t_2$ (FIG. 1). The first time interval $\Delta t_1$ and the second time interval $\Delta t_2$ have approximately equal temporal lengths (FIG. 2), while the first temporal delays $\Delta t_1$ generated in the first delay unit 24 and the second temporal delays $\Delta t_2$ generated in the second delay unit 34 can be built up, inter alia, with gate delay times.

This second delay unit 34 is connected to a second D(elay)-flipflop unit 36 whose clock input 36c is connected to the output 34o of the second delay unit 34 and whose D input 36m is connected to the modulation signal input 12. In this way, the Q output 36o of the second D(elay)-flipflop unit 36 supplies the second modulation signal $M_2$, in which the Q output 36o follows the signal of the D input 36m. The second modulation signal $M_2$ is temporally shifted with respect to the first modulation signal $M_1$ by half a clock period of the external clock signal $C_0$, because the first clock signal $C_1$ and the second clock signal $C_2$ are mutually inverted.

As is further evident from FIG. 1, the circuit arrangement 100 comprises a first driver stage 40 which is connected to a first power supply voltage $U_{dd,1}$ (FIG. 2) amplitude-modulated by the first modulation signal $M_1$, and to a first reference potential $U_{ss,1}$ (=earth potential) and which can be impressed with the first clock signal $C_1$ in such a way that the output voltage $U_{o,1}$ of the first driver stage 40, which can be applied to the first terminal of the integrated circuit, temporally assumes the value of the amplitude-modulated first power supply voltage $U_{dd,1}$ and temporally the value of the first reference potential $U_{ss,1}$ (FIG. 2) in accordance with the clock of the first clock signal $C_1$.

Figure 2:
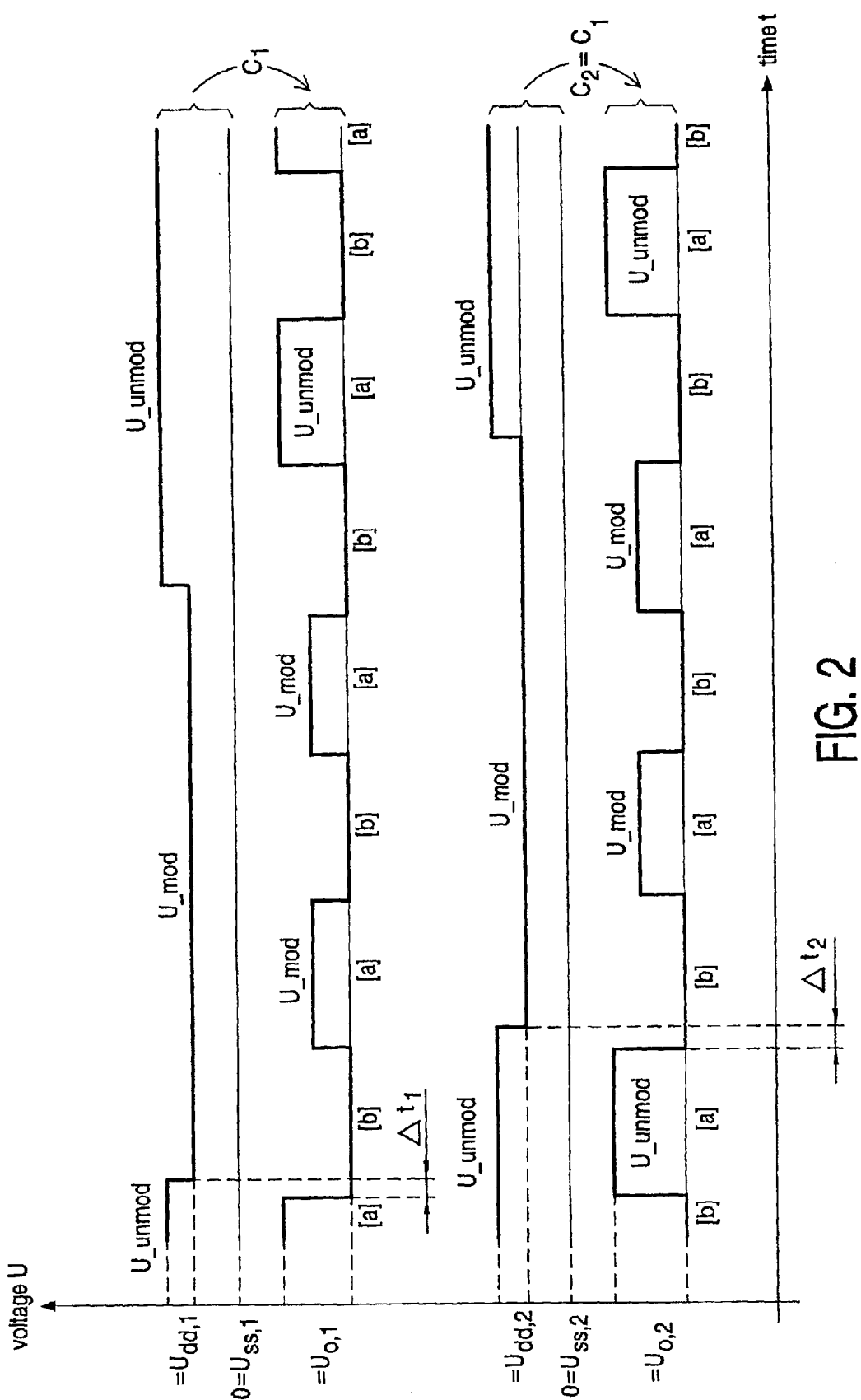
FIG. 2 is a diagram in which the temporal voltage variation in the first driver stage and at the output of the first driver stage is compared with the temporal voltage variation in the second driver stage and at the output of the second driver stage.

To this end, the first driver stage 40 has a clock signal input 42c provided for the first clock signal $C_1$, a modulation signal input 42m, provided for the first modulation signal $M_1$, for controlling the switching of the modulation voltage U_unmod or U_mod to the amplitude-modulated first power supply voltage $U_{dd,1}$ (FIGS. 1 and 2), a first electronic switch 44 formed, for example, as a transistor, a second electronic switch 46 also formed, for example, as a transistor and coupled to the first switch 44, and an output 48 provided for the first output signal comprising the output voltage $U_{o,1}$ (FIG. 2).

In general, the function of the first driver stage 40 is based in this respect on the fact that—controlled by the clock of the first clock signal $C_1$—each time one of the switches 44 and 46 becomes conducting so that the output 48 of the first driver stage 40 is alternately connected to the amplitude-modulated first power supply voltage $U_{dd,1}$ (modulation voltages U_unmod or U_mod, FIGS. 1 and 2) and to the first reference potential $U_{ss,1}$ (FIG. 2). The first temporal delay $\Delta t_1$ generated in the first delay unit 24 of the control stage 10 should be adjusted in such a way that the switching of the first power supply voltage $U_{dd,1}$ from the modulation voltage U_unmod to the modulation voltage U_mod always takes place when the second switch 46 of the first driver stage 40 is conducting.

In order that the output voltage $U_{o,1}$ of the first driver stage 40, which output voltage can be applied to the first terminal of the integrated circuit, temporally assumes the value of the amplitude-modulated first power supply voltage $U_{dd,1}$ and temporally the value of the first reference potential $U_{ss,1}$ (FIG. 2) in accordance with the clock of the first clock signal $C_1$, the control means 442 of the first switch 44 and the control means 462 of the second switch 46 are connected to the clock signal input 42c of the first driver stage 40. The power supply voltage-sided contact 444 of the first switch 44 is connected to the amplitude-modulated first power supply voltage $U_{dd,1}$ whereas the reference potential-sided contact 464 of the second switch 46 is connected to the first reference potential $U_{ss,1}$. The output voltage-sided contact 446 of the first switch 44 and the output voltage-sided contact 466 of the second switch 46 are connected together and to the output 48 of the first driver stage 40.

As is apparent from FIG. 1, the circuit arrangement 100 comprises a second driver stage 50 which is complementary to the first driver stage 40 and is connected to a second power supply voltage $U_{dd,2}$ (FIG. 2) amplitude-modulated by the second modulation signal $M_2$, and to a second reference potential $U_{ss,2}$ (=earth potential), and which can be impressed with the second clock signal $C_2$ in such a way that the output voltage $U_{o,2}$ of the second driver stage 50, which can be applied to the second terminal of the integrated circuit, temporally assumes the value of the amplitude-modulated second power supply voltage $U_{dd,2}$ and temporally the value of the second reference potential $U_{ss,2}$ (FIG. 2) in accordance with the clock of the second clock signal $C_2$.

To this end, the second driver stage 50 has a clock signal input 52c provided for the second clock signal $C_2$, a modulation signal input 52m, provided for the second modulation signal $M_2$, for controlling the switching of the modulation voltage U__unmod or U__mod to the amplitude-modulated second power supply voltage $U_{dd,2}$ (FIGS. 1 and 2), a first electronic switch 54 formed, for example, as a transistor, a second electronic switch 56 also formed, for example, as a transistor and coupled to the first switch 54, and an output 58 provided for the second output signal comprising the output voltage $U_{o,2}$ (FIG. 2).

In general, the function of the second driver stage 50 is based in this respect on the fact that—controlled by the clock of the second clock signal $C_2$ which is inverted with respect to the first clock signal $C_1$—each time one of the switches 54 and 56 becomes conducting so that the output 58 of the second driver stage 50 is alternately connected to the amplitude-modulated second power supply voltage $U_{dd,2}$ (modulation voltages U__unmod or U__mod; FIGS. 1 and 2) and to the second reference potential $U_{ss,2}$ (FIG. 2). The second temporal delay $\Delta t_2$ generated in the second delay unit 34 of the control stage 10 should be adjusted in such a way that the switching of the second power supply voltage $U_{dd,2}$ from the modulation voltage U__unmod to the modulation voltage U__mod always takes place when the second switch 56 of the second driver stage 50 is conducting.

In order that the output voltage $U_{o,2}$ of the second driver stage 50, which output voltage can be applied to the second terminal of the integrated circuit, temporally assumes the value of the amplitude modulated second power supply voltage $U_{dd,2}$ and temporally the value of the second reference potential $U_{ss,2}$ (FIG. 2) in accordance with the clock of the second clock signal $C_2$, the control means 542 of the first switch 54 and the control means 562 of the second switch 56 are connected to the clock signal input 52c of the second driver stage 50. The power supply voltage-sided contact 544 of the first switch 54 is connected to the amplitude-modulated second power supply voltage $U_{dd,2}$, whereas the reference potential-sided contact 564 of the second switch 56 is connected to the second reference potential $U_{ss,2}$. The output voltage-sided contact 546 of the first switch 54 and the output voltage-sided contact 566 of the second switch 56 are connected together and to the output 58 of the second driver stage 50.

As regards the embodiment of the circuit arrangement 100 shown in FIGS. 1 and 2, the invention has the essential significance that the amplitude modulation is effected via the switching of the relevant power supply voltages $U_{dd,1}$ and $U_{dd,2}$ of the two driver stages 40 and 50, which power supply voltages $U_{dd,1}$ and $U_{dd,2}$ of the two driver stages 40 and 50 are switched at different instants because the first time interval $\Delta t_1$ and the second time interval $\Delta t_2$ have approximately equal temporal lengths. To this end, the two driver stages 40 and 50 are impressed with the mutually inverted, but symmetrical clock signals $C_1$ and $C_2$ so that two equally long clock phases [a] and [b] (FIG. 2) are produced at the outputs 48 and 58 of the driver stages 40 and 50, respectively.

In clock phase [a] (FIG. 2) the relevant first switch 44, 54 is conducting and the relevant second switch 46, 56 is blocked so that the power supply voltages $U_{dd,1}$ and $U_{dd,2}$ are connected to the relevant outputs 48 and 58 of the driver stages 40 and 50, respectively. In clock phase [b] (FIG. 2), the relevant first switch 44, 54 is blocked and the relevant second switch 46, 56 is conducting so that the reference potentials $U_{ss,1}$ and $U_{ss,2}$ are connected to the relevant outputs 48, 58 of the driver stages 40 and 50, respectively.

As can be seen in FIG. 2, the first temporal delay $\Delta t_1$ generated in the first delay unit 24 and the second temporal delay $\Delta t_2$ generated in the second delay unit 34 are to be chosen in such a way that the first modulation signal $M_1$ and the second modulation signal $M_2$ switch the relevant power supply voltages $U_{dd,1}$ and $U_{dd,2}$ of the two driver stages 40 and 50 in the clock phase [b] in a secure manner (FIG. 2), in which clock phase the relevant power supply voltages $U_{dd,1}$ and $U_{dd,2}$ are not connected to the relevant outputs 48 and 58 of the driver stages 40 and 50, respectively. Since the two driver stages 40 and 50 operate with mutually inverted clock signals $C_1$ and $C_2$, the relevant instant of switching for the two driver stages 40 and 50 is different in this case (FIG. 2).

List of reference signs

| | |
|---|---|
| 100 | circuit arrangement |
| 10 | control stage |
| 12 | modulation signal input of control stage 10 |
| 14 | clock signal input of control stage 10 |
| 22 | first logic gate circuit (=exclusive-OR circuit) |
| 22a | an input of the first logic gate circuit 22 |
| 22b | another input of the first logic gate circuit 22 |
| 22o | output of the first logic gate circuit 22 |
| 24 | first delay unit |
| 24o | output of the first delay unit 24 |
| 26 | first D(elay)-flipflop unit |
| 26c | clock input of the first D(elay)-flipflop unit 26 |
| 26m | D input of the first D(elay)-flipflop unit 26 |
| 26o | Q output of the first D(elay)-flipflop unit 26 |
| 32 | second logic gate circuit (=exclusive-OR circuit) |
| 32a | an input of the second logic gate circuit 32 |
| 32b | another input of the second logic gate circuit 32 |
| 32o | output of the second logic gate circuit 32 |
| 34 | second delay unit |
| 34o | ouput of the second delay unit 34 |
| 36 | second D(elay)-flipflop unit |
| 36c | clock input of the second D(elay)-flipflop unit 36 |
| 36m | D input of the second D(elay)-flipflop unit 36 |
| 36o | Q output of the second D(elay)-flipflop unit 36 |
| 40 | first driver stage |
| 42c | clock signal input of the first driver stage 40 |
| 42m | modulation signal input of the first driver stage 40 |
| 44 | first electronic switch of the first driver stage 40 |
| 442 | control means of the first switch 44 |
| 444 | power supply voltage-sided contact of the first switch 44 |
| 446 | ouput voltage-sided contact of the first switch 44 |
| 46 | second electronic switch of the first driver stage 40 |

-continued

List of reference signs

| | |
|---|---|
| 462 | control means of the second switch 46 |
| 464 | reference potential-sided contact of the second switch 46 |
| 466 | output voltage-sided contact of the second switch 46 |
| 48 | output of the first driver stage 40 |
| 50 | second driver stage |
| 52c | clock signal input of the second driver stage 50 |
| 52m | modulation signal input of the second driver stage 50 |
| 54 | first electronic switch of the second driver stage 50 |
| 542 | control means of the first switch 54 |
| 544 | power supply voltage-sided contact of the first switch 54 |
| 546 | output voltage-sided contact of the first switch 54 |
| 56 | second electronic switch of the second driver stage 50 |
| 562 | control means of the second switch 56 |
| 564 | reference potential-sided contact of the second switch 56 |
| 566 | output voltage-sided contact of the second switch 56 |
| 58 | output of the second driver stage 50 |
| $C_0$ | external clock signal |
| $C_1$ | first clock signal |
| $C_2$ | second clock signal inverted with respect to the first clock signal $C_1$ |
| $M_0$ | external modulation signal |
| $M_1$ | first modulation signal |
| $M_2$ | second modulation signal temporally shifted with respect to the first modulation signal $M_1$ |
| $\Delta t_1$ | first time interval |
| $\Delta t_2$ | second time interval different from the first time interval $\Delta t_2$ |
| U__(un)mod | relevant modulation voltage |
| $U_{dd,1}$ | amplitude-modulated first power supply voltage |
| $U_{dd,2}$ | amplitude-modulated second power supply voltage |
| $U_{o,1}$ | output voltage of the first driver stage 40 |
| $U_{o,2}$ | output voltage of the second driver stage 50 |
| $U_{ss,1}$ | first reference potential |
| $U_{ss,2}$ | second reference potential |

What is claimed is:

1. A circuit arrangement for controlling a first terminal and a second terminal of a contactless integrated circuit, characterized in that the circuit arrangement (100) comprises:
    at least a control stage (10) which generates, from an external modulation signal ($M_0$) and an external clock signal ($C_0$)
        a first modulation signal ($M_1$);
        a second modulation signal ($M_2$) which is temporally shifted with respect to the first modulation signal ($M_1$);
        a symmetrical first clock signal ($C_1$); and
        a symmetrical second clock signal ($C_2$) which is inverted with respect to the first clock signal ($C_1$);
    at least a first driver stage (40),
        which is connected to a first power supply voltage ($U_{dd,1}$) amplitude-modulated by the first modulation signal ($M_1$) and to a first reference potential ($U_{ss,1}$) and
        which is impressed with the first clock signal ($C_1$) in such a way that the output voltage ($U_{o,1}$) of the first driver stage (40), applied to the first terminal of the integrated circuit, temporally assumes the value of the amplitude-modulated first power supply voltage ($U_{dd,1}$) and temporally the value of the first reference potential ($U_{ss,1}$) in accordance with the clock of the first clock signal ($C_1$); and
    at least a second driver stage (50),
        which is connected to a second power supply voltage ($U_{dd,2}$) amplitude-modulated by the second modulation signal ($M_2$) and to a second reference potential ($U_{ss,2}$) and
        which is impressed with the second clock signal ($C_2$) in such a way that the output voltage ($U_{o,2}$) of the second driver stage (50), applied to the second terminal of the integrated circuit, temporally assumes the value of the amplitude-modulated second power supply voltage ($U_{dd,2}$) and temporally the value of the second reference potential ($U_{ss,2}$) in accordance with the clock of the second clock signal ($C_2$).

2. A circuit arrangement as claimed in claim 1, characterized in that the control stage (10) comprises:
    a modulation signal input (12) provided for the external modulation signal ($M_0$);
    a clock signal input (14) provided for the external clock signal ($C_0$);
    a first logic gate circuit, particularly an exclusive-OR circuit (22) connected to the clock signal input (14) and supplying the first clock signal ($C_1$) from its output (22o);
    a second logic gate circuit, particularly an exclusive-OR circuit (32) arranged parallel to the first logic gate circuit (22) and connected to the clock signal input (14) and supplying the second clock signal ($C_2$) which is inverted with respect to the first clock signal ($C_1$) from its output (32o);
    a first delay unit (24) delaying the first clock signal ($C_1$) by a first time interval ($\Delta t_1$) and connected to the output (22o) of the first logic gate circuit (22);
    a second delay unit (34) delaying the second clock signal ($C_2$) by a second time interval ($\Delta t_2$) and connected to the output (32o) of the second logic gate circuit (32);
    a first D(elay)-flipflop unit (26);
        whose clock input (26c) is connected to the output (24o) of the first delay unit (24);
        whose D input (26m) is connected to the modulation signal input (12); and
        whose Q output (26o) supplies the first modulation signal ($M_1$); and
    a second D(elay)-flipflop unit (36),
        whose clock input (36c) is connected to the output (34o) of the second delay unit (34);
        whose D input (36m) is connected to the modulation signal input (12); and
        whose Q output (36o) supplies the second modulation signal ($M_2$) which is temporally shifted with respect to the first modulation signal ($M_1$).

3. A circuit arrangement as claimed in claim 2, characterized in that the first temporal delay ($\Delta t_1$) generated in the first delay unit (24) and the second temporal delay ($\Delta t_2$) generated in the second delay unit (34) have approximately equal temporal lengths.

4. A circuit arrangement as claimed in claim 2, characterized in that the first temporal delays ($\Delta t_1$) generated in the first delay unit (24) and/or the second temporal delays ($\Delta t_2$) generated in the second delay unit (34) can each be built up with gate delay times.

5. A circuit arrangement as claimed claim 1, characterized in that the second modulation signal ($M_2$) is temporally shifted with respect to the first modulation signal ($M_1$) by approximately half a clock period of the external clock signal ($C_0$).

6. A circuit arrangement as claimed in claim 1, characterized in that
    the first driver stage (40) comprises:
        a clock signal input (42c) provided for the first clock signal ($C_1$);
        a modulation signal input (42m) provided for the first modulation signal ($M_1$) for controlling the switching of each modulation voltage (U_unmod or U_mod) to the amplitude-modulated first power supply voltage ($U_{dd,1}$);

a first electronic switch (44);

a second electronic switch (46) coupled to the first switch (44); and an output (48) provided for the first output signal comprising the output voltage ($U_{o,1}$), wherein a control means (442) of the first switch (44) and a control means (462) of the second switch (46) are each connected to the clock signal input (42c);

a power supply voltage-sided contact (444) of the first switch (44) is connected to the amplitude-modulated first power supply voltage ($U_{dd,1}$), a reference potential-sided contact (464) of the second switch (46) is connected to the first reference potential ($U_{ss,1}$), and an output voltage-sided contact (446) of the first switch (44) and an output voltage-sided contact (466) of the second switch (46) are connected together and to the output (48), and in that the second driver stage (50) comprises:

a clock signal input (52c) provided for the second clock signal ($C_2$);

a modulation signal input (52m) provided for the second modulation signal ($M_2$) for controlling the switching of each modulation voltage (U_unmod or U_mod) to the amplitude-modulated second power supply voltage ($U_{dd,2}$);

a first electronic switch (54);

a second electronic switch (56) coupled to the first switch (54); and an output (58) provided for the second output signal comprising the output voltage ($U_{o,2}$), wherein a control means (542) of the first switch (54) and a control means (562) of the second switch (56) are each connected to the clock signal input (52c), a power supply voltage-sided contact (544) of the first switch (54) is connected to the amplitude-modulated second power supply voltage ($U_{dd,2}$), a reference potential-sided contact (564) of the second switch (56) is connected to the second reference potential ($U_{ss,2}$), and an output voltage-sided contact (546) of the first switch (54) and an output voltage-sided contact (566) of the second switch (56) are connected together and to the output (58).

7. A circuit arrangement as claimed in claim 6, characterized in that the relevant first electronic switch (44; 54) and/or the relevant second electronic switch (46; 56) are formed as transistors.

8. A circuit arrangement as claimed in claim 1, characterized in that the first driver stage (40) and the second driver stage (50) are complementary with respect to each other.

9. A circuit arrangement as claimed in claim 1, characterized in that the first power supply voltage ($U_{dd,1}$) and the second power supply voltage ($U_{dd,2}$) have different values.

10. A circuit arrangement as claimed in claim 1, characterized in that the first reference potential ($U_{ss,1}$) and the second reference potential ($U_{ss,2}$) are at least approximately equally large.

11. A circuit arrangement as claimed in claim 1, characterized in that the first reference potential ($U_{ss,1}$) and/or the second reference potential ($U_{ss,2}$) are the earth potential or the ground potential.

12. A contactless integrated circuit, particularly a CMOS circuit controlled and particularly tested by at least a circuit arrangement (100) as claimed in any one of claim 1.

13. An intergrated circuit as claimed in claim 12, characterized in that the intergrated circuit arranged on a wafer of a carrier substrate of a semiconducting or insulating material.

* * * * *